United States Patent Office

3,514,482
Patented May 26, 1970

3,514,482
[3- AND 4-(2-ALKYLIDENEALKANOYL)PHENOXY]-
FLUOROACETIC ACIDS
Edward J. Cragoe, Jr., Lansdale, Pa., assignor to Merck
& Co. Inc., Rahway, N.J., a corporation of New
Jersey
No Drawing. Filed June 24, 1966, Ser. No. 560,069
Int. Cl. C07c 65/02
U.S. Cl. 260—521                                    6 Claims

ABSTRACT OF THE DISCLOSURE

Relates to [3 and 4-(2-alkylidenealkanoyl)phenoxy]-fluoroacetic acid products wherein the 2-carbon of the alkanoyl moiety may be substituted by trifluoromethyl lower alkyl, cycloalkyl, aryl or aralkyl; and the salts, esters and amide derivatives thereof. The products are obtained via the reaction of a 2-alkylidene-3' (or 4')-hydroxyalkanophenone with an halo substituted fluoroacetic acid ester in the presence of a base to afford a [3 and 4-(2-alkylidenealkanoyl)phenoxy]fluoroacetate which, if desired, may be converted to the corresponding carboxylic acid or its salts or amide derivatives by conventional means. The said products are diuretic and saluretic agents which are useful in the treatment of conditions usually associated with edema.

---

This invention relates to a new class of chemical compounds which can be described generally as [3 and 4-(2-alkylidenealkanoyl)phenoxy]fluoroacetic acids and to the nontoxic, pharmacologically acceptable salts, esters and amide derivatives thereof.

Also, it is an object of this invention to describe a novel method of preparation for the instant [3 and 4-(2-alkylidenealkanoyl)phenoxy]fluoroacetic acids and their salts, esters and amides.

Pharmacological studies show that the instant products are effective diuretic and saluretic agents which can be used in the treatment of conditions associated with electrolyte and fluid retention and hypertension. When administered in therapeutic dosages, in conventional vehicles, the instant products effectively reduce the amount of sodium and chloride ions in the body, lower dangerous excesses of fluid levels to acceptable limits and, in general, alleviate conditions usually associated with edema.

The products of this invention are compounds having the following general formulae:

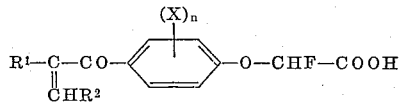

and

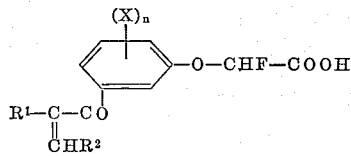

wherein R is alkyl, for example, lower alkyl, trifluoromethyl substituted lower alkyl, for example, 2,2,2-trifluoroethyl, 2,2,2-trifluoroisopropyl, etc., cycloalkyl, for example, mononuclear cycloalkyl containing from 5–6 nuclear carbon atoms, mononuclear aryl such as phenyl and mononuclear aralkyl such as benzyl, etc.; $R^2$ is hydrogen or lower alkyl, for example, methyl, ethyl, isopropyl, etc.; X represents one or more similar or dissimilar members selected from hydrogen, halogen, lower alkyl and, when substituted on adjacent carbon atoms of the benzene nucleus, two X radicals may be combined to form an hydrocarbylene chain (i.e., a divalent organic radical composed solely of carbon and hydrogen) containing from three to four carbon atoms between their points of attachment to the benzene ring, for example, trimethylene, tetramethylene, 1,3-butadienylene (i.e., —CH=CH—CH=CH—), etc.; and $n$ is an integer having a value of 1–2; and the salts thereof derived from nontoxic, pharmacologically acceptable bases such as alkali metal or alkaline earth metal hydroxides, carbonates, bicarbonates, etc.

A preferred embodiment of this invention relates to [4-(2-methylenealkanoyl)phenoxy]fluoroacetic acids having the following general formula:

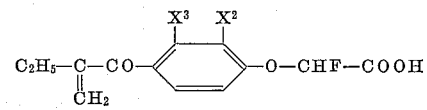

wherein $X^2$ and $X^3$ are similar or dissimilar members selected from hydrogen, halogen and lower alkyl; and to the nontoxic, pharmacologically acceptable salts thereof. The foregoing class of compounds exhibits particularly good diuretic and saluretic activity and represents a preferred subgroup of compounds within the scope of this invention.

The products of this invention are conveniently prepared by treating a 2-alkylidene-3' (or 4')-hydroxyalkanophenone (II) with a chloro, bromo or iodo substituted fluoroacetic acid ester in the presence of a base and the [3 or 4-(2-alkylidenealkanoyl)phenoxy]fluoroacetate thus obtained may be isolated and purified or, if the corresponding carboxylic acid product is desired, the said ester intermediate may be hydrolyzed by treatment with an aqueous solution of a base and then with an acid, such as hydrochloric acid, to yield the corresponding [3 or 4-(2-alkylidenealkanoyl)phenoxy]fluoroacetic acid. Also, if desired, and to facilitate isolation of the product, the [3 or 4-(4-alkylidenealkanoyl)phenoxy]fluoroacetic acid obtained by the foregoing method may be converted to its corresponding salt by treating the said acid with a suitable base; suitable bases include, for example, sodium bicarbonate, sodium hydroxide, potassium carbonate, potassium hydroxide, calcium hydroxide, etc.

The following equations illustrate the foregoing method of preparation and depict the stepwise formation of the carboxylic acid ester (III, infra), the corresponding free acid (I, infra) and the salt (Ia, infra). The [3 or 4-(2-alkylidenealkanoyl)phenoxy]fluoroacetate salt (Ia) depicted below is the sodium salt, but it will be appreciated by those skilled in the art that other salts could also be obtained in a similar manner by substituting an appropriate basic reagent for the sodium bicarbonate recited infra:

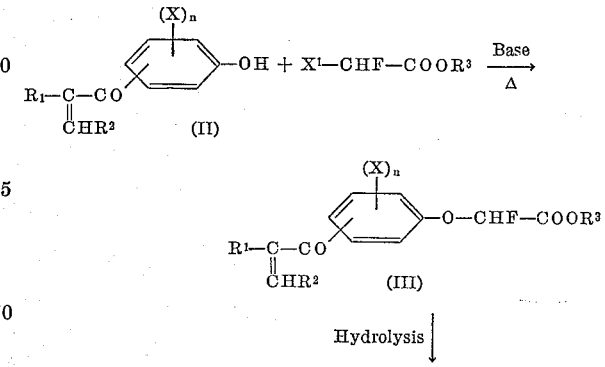

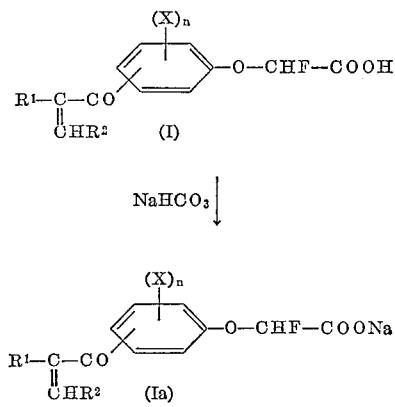

wherein $R^1$, $R^2$, X and $n$ are as defined above; $R^3$ is an hydrocarbyl radical, i.e., a monovalent organic radical composed solely of carbon and hydrogen, such as alkyl, for example, lower alkyl, etc. and $X^1$ is chloro, bromo or iodo.

The [3 or 4-(2-alkylidenealkanoyl)phenoxy]fluoroacetic acid salts of this invention are generally obtained as crystalline solids and, if desired, may be purified by recrystallization from a suitable solvent such as water or a mixture of water and a lower alkanol.

The 2 - alkylidene - 3'(or 4')-hydroxyalkanophenones (II) which are employed as starting materials in the process of this invention and the method for their preparation, are described in applicant's copending application Ser. No. 361,932, filed Apr. 20, 1964, now U.S. Pat. No. 3,322,832 issued May 30, 1967.

In addition to the [3 and 4-(2-alkylidenealkanoyl) phenoxy]fluoroacetic acids (I) and their corresponding salts, described above, this invention also relates to the corresponding ester and amide derivatives thereof. Esters and amides within the scope of this invention include, for example, the lower alkyl esters and the amide, monoalkylamide, dialkylamide and heterocyclic amide derivatives as, for example, amides derived from such heterocyclic amines, such as, pyrrolidine, piperidine, morpholine, etc. The said ester derivatives may be prepared inherently during the process as shown by the preparative method described above (see compound III, supra) and the amide derivatives may be prepared by treating the 2-alkylidene-3'(or 4')-hydroxyalkanophenone (II) starting material of the instant process with a chloro, bromo or iodo substituted fluoroacetamide or with an appropriately substituted N-fluoroacetamide.

The examples which follow illustrate the [3 and 4-(2-alkylidenealkanoyl)phenoxy]fluoroacetic acids of this invention and the corresponding ester and amide derivatives thereof and, also, the methods by which they may be prepared. However, the examples are illustrative only and it will be apparent to those having ordinary skill in the art that all of the instant products may be prepared in an analogous manner by substituting the appropriate starting materials for those set forth in the examples.

EXAMPLE 1

Sodium [2,3-dichloro-4-(2-methylenebutyryl)phenoxy] fluoroacetate

Step A: Ethyl [2,3-dichloro-4-(2-methylenebutyryl) phenoxy]fluoroacetic acid.—To a solution of 2-methylene-2',3'-dichloro-4'-hydroxybutyrophenone (4.90 g., 0.02 mole) in dimethylformamide (20 ml.) is added potassium carbonate (6.08 g., 0.044 mole). Then ethyl bromofluoroacetate (8.14 g., 0.044 mole) is added and the reaction mixture is heated at 55–60° C. for 30 minutes with stirring.

The cooled reaction mixture is treated with water (50 ml.) and the resulting oil is extracted with ether. The combined extracts are dried over anhydrous magnesium sulfate and the ether is evaporated under reduced pressure to yield the ethyl ester of [2,3-dichloro-4-(2-methylenebutyryl)phenoxy]fluoroacetic acid in the form of an oil.

Step B: [2,3 - dichloro-4-(2-methylenebutyryl)phenoxy]fluoroacetic acid.—The ester is dissolved in ethanol (75 ml.) and treated with a solution of sodium bicarbonate (3.36 g., 0.04 mole) in water (150 ml.). The mixture is heated on a steam bath with stirring for 15 minutes and then concentrated under reduced pressure to a volume of 50 ml. To the residue is added water (50 ml.) and the solution is acidified to Congo red test paper by the addition of 6 N hydrochloric acid. The resulting oil is extracted with ether and the combined extracts are dried over anhydrous magnesium sulfate. The ether is evaporated under reduced pressure to give 6.42 g. (100%) of any oil residue identified as [2,3-dichloro-4-(2-methylenebutyryl) phenoxy]fluoroacetic acid.

Step C: Sodium [2,3-dichloro-4-(2-methylenebutyryl) phenoxy]fluoroacetate.—The [2,3 - dichloro-4-(2-methylenebutyryl)phenoxy]fluoroacetic acid of Step B is dissolved in a boiling solution of sodium bicarbonate (1.68 g., 0.02 mole) in water (50 ml.) and the pH adjusted to 7.5–8.0 by the addition of several drops of a 20% aqueous sodium hydroxide solution. The boiling solution is then rapidly cooled in an ice bath to yield 4.71 g. (69%) of sodium [2,3 - dichloro-4-(2-methylenebutyryl)phenoxy] fluoroacetate in the form of a white, crystalline solid. This salt can be purified further by recrystallization from boiling water and has a melting point of 143–144° C. (dec.).

*Analysis.*—Calc'd for $C_{13}H_{10}Cl_2FNaO_4$ (percent): C, 45.50; H, 2.94; Cl, 20.67; F, 5.54. Found (percent): C, 45.43; H, 3.25; Cl, 20.54; F, 5.45.

EXAMPLE 2

Sodium [2,4-dimethyl-5-(2-methylenebutyryl)phenoxy] fluoroacetate

By substituting 2-methylene-2',4'-dimethyl-5'-hydroxybutyrophenone for the 2-methylene-2',3'-dichloro-4'-hydroxybutyrophenone recited in Example 1, Step A, and following the procedure described in Steps A, B and C of that example, the product sodium [2,4-dimethyl-5-(2-methylenebutyryl)phenoxy]fluoroacetate is obtained.

EXAMPLE 3

[2,3-dichloro-4-(2-methylenebutyryl)phenoxy] fluoroacetamide

By substituting bromofluoroacetamide for the ethyl bromofluoroacetate recited in Example 1, Step A, and following the procedure described in that example and step, the product [2,3-dichloro-4-(2-methylenebutyryl) phenoxy]fluoroacetamide is obtained.

In a manner similar to that described in Example 1, Steps A, B and C, supra, for the preparation of ethyl [2,3-dichloro - 4 - (2-methylenebutyryl)phenoxy]fluoroacetate and the free acid and the sodium salt derivatives thereof, respectively, all of the products of this invention may be obtained. Thus, by substituting an appropriate 2-alkylidene-3' (or 4')-hydroxybutyrophenone (IV, infra) and alkyl chloro(bromo or iodo)acetate (V, infra) for the 2-methylene-2',3'-dichloro-4' - hydroxybutyrophenone and ethyl bromofluoroacetate of Example 1, Step A, and following substantially the procedure described in Steps A, B and C of that example, all of the [3 and 4-(2-alkylidenealkanoyl)phenoxy]fluoroacetic acid esters of this invention and their corresponding acids and salts may be obtained. The following equation illustrates the reaction of Example 1, Steps A, B and C and, together with Table I (infra), depict the 2-alkylidene-4'-hydroxyalkanophenone and alkyl halofluoroacetate starting materials of the instant process and the corresponding products derived therefrom:

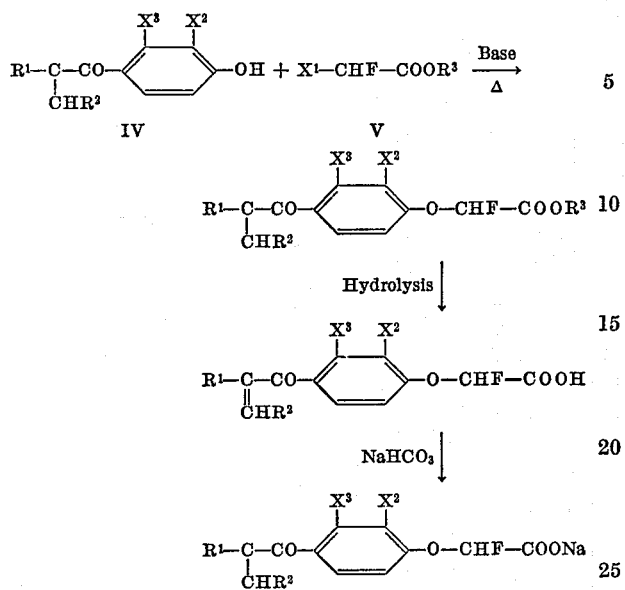

The products of the invention can be administered in a wide variety of therapeutic dosages in conventional vehicles as, for example, by oral administration in the form of a capsule or tablet as well as by intravenous injection. Also, the dosage of the products may be varied over a wide range as, for example, in the form of capsules or scored tablets containing 5, 10, 20, 25, 50, 100, 150, 250 and 500 milligrams, i.e., from 5 to about 500 milligrams, of the active ingredient for the symptomatic adjustment of the dosage to the patient to be treated. These dosages are well below the toxic or lethal dose of the products.

A suitable unit dosage form of the products of this invention can be prepared by mixing 50 mg. of a [3 or 4 - (2-alkylidenealkanoyl)phenoxy]fluoroacetic acid or a suitable acid addition salt, ester or amide derivative thereof, with 144 mg. of lactose and 6 mg. of magnesium stearate and placing the 200 mg. mixture into a No. 3 gelatin capsule. Similarly, by employing more of the active ingredient and less lactose, other dosage forms can be put up in No. 3 gelatin capsules and, should it be necessary to mix more than 200 mg. of ingredients together, larger capsules may be employed. Compressed tablets, pills or other desired unit dosages can be prepared to incorporate the compounds of this invention by conventional methods and, if desired, can be made up as elixirs or as injectable solutions by methods well known to pharmacists.

It is also within the scope of this invention to combine two or more of the compounds of this invention in a unit dosage form or to combine one or more of the compounds with other known diuretics and saluretics or with other desired therapeutic and/or nutritive agents in dosage unit form.

The following example is included to illustrate the preparation of a representative dosage form:

EXAMPLE 18

Dry-filled capsules containing 50 mg. of active ingredient per capsule

|  | Per capsule, mg. |
|---|---|
| Sodium [2,3-dichloro-4 - (2 - methylenebutyryl)phenoxy]fluoroacetate | 50 |
| Lactose | 144 |
| Magnesium stearate | 6 |
| Capsule size No. 3 | 200 |

The sodium [2,3-dichloro-4-(2-methylenebutyryl)phenoxy]fluoroacetate is reduced to a No. 60 powder and then lactose and magnesium stearate are passed through a No. 60 bolting cloth onto the powder and the combined ingredients admixed for 10 minutes and then filled into No. 3 dry gelatin capsules.

Similar dry-filled capsules can be prepared by replacing the active ingredient of the above example by any of the other novel compounds of this invention.

It will be apparent from the foregoing description that the [3 and 4-(2-alkylidenealkanoyl)phenoxy]fluoroacetic acid products of this invention and their salt, ester and amide derivatives constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound selected from the group consisting of:

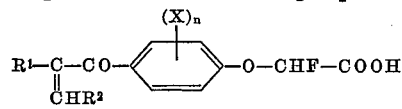

and

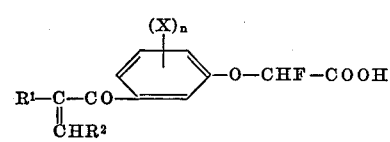

TABLE I

| Ex. | $R^1$ | $R^2$ | $R^3$ | $X^1$ | $X^2$ | $X^3$ |
|---|---|---|---|---|---|---|
| 4 | $-C_2H_5$ | H | $-C_2H_5$ | Br | H | Cl |
| 5 | $-C_2H_5$ | H | $-CH_3$ | Cl | $-CH_3$ | $-CH_3$ |
| 6 | $-CH_2CF_3$ | H | $-CH_3$ | Br | $-CH_3$ | $-CH_3$ |
| 7 | $-C_2H_5$ | $-CH_3$ | $-C_2H_5$ | Cl | Cl | Cl |
| 8 | $-CHCH_3CF_3$ | H | $-CH_3$ | Br | H | $-CH_3$ |
| 9 | $-C_2H_5$ | H | $-(CH_2)_2CH_3$ | Cl | $-CH=CH-$ | $-CH=CH-$ |
| 10 | $-C_2H_5$ | H | $-CH_3$ | Br | Cl | $-CH_3$ |
| 11 | $-C_2H_5$ | H | $-CH_3$ | Cl | $-CH_3$ | Cl |
| 12 | $-CH(CH_3)_2$ | H | $-CH(CH_3)_2$ | Cl | Cl | Cl |
| 13 | $-CH_3$ | H | $-C_2H_5$ | I | H | Cl |
| 14 | –⟨S⟩ | H | $-CH_3$ | Br | H | Cl |
| 15 | –⟨phenyl⟩ | H | $-(CH_2)_2CH_3$ | Cl | H | Cl |
| 16 | –⟨S⟩ | H | $-C_2H_5$ | Br | H | Cl |
| 17 | $-CH_2-$⟨phenyl⟩ | H | $-CH_3$ | Br | H | Cl | wherein $R^1$ is lower alkyl, trifluoromethyl substituted lower alkyl, cycloalkyl containing 5-6 nuclear carbon atoms, mononuclear aryl or mononuclear aralkyl; $R^2$ is hydrogen or lower alkyl; X represents one or more similar or dissimilar members selected from hydrogen, halogen, lower alkyl and, when substituted on adjacent carbon atoms of the benzene nucleus, two X radicals may be combined to form an hydrocarbylene chain selected from trimethylene, tetramethylene or 1,3-butadienylene and $n$ is an integer having a value of 1-2; and the nontoxic, pharmacologically acceptable salts, lower alkyl esters and amide, monoalkylamide, dialkylamide, pyrrolidide, piperidide and morpholide derivatives thereof.

2. A compound having the formula:

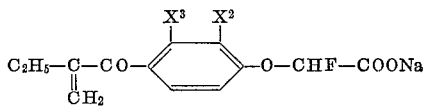

wherein $X^2$ and $X^3$ are similar or dissimilar members selected from hydrogen, halogen and lower alkyl and the nontoxic, pharmacologically acceptable salts thereof.

3. The product of claim 2 wherein $X^2$ and $X^3$ represent halogen.

4. The product of claim 2 wherein $X^2$ is hydrogen and $X^3$ is halogen.

5. The product of claim 2 wherein $X^2$ and $X^3$ represent lower alkyl.

6. Sodium [2,3 - dichloro - 4-(2-methylenebutyryl)phenoxy]fluoroacetate.

References Cited
UNITED STATES PATENTS 3,317,591  5/1967  Schultz _____ 260—521

OTHER REFERENCES

Morrison & Boyd, "Organic Chemistry," Allyn & Bacon, Boston, 1959, pp. 438 and 593.

LORRAINE A. WEINBERGER, Primary Examiner

D. E. STENZEL, Assistant Examiner

U.S. Cl. X.R.

260—247.7, 294.7, 326.5, 473, 520, 559; 424—308, 317, 324

UNITED STATES PATENT OFFICE
CERTIFICATE OF CORRECTION

Patent No. 3,514,482      Dated May 26, 1970

Inventor(s) Edward J. Cragoe, Jr.

It is certified that error appears in the above-identified patent and that said Letters Patent are hereby corrected as shown below:

In column 1, line 62, "R" should be -- $R^1$ --;
In column 2, line 41, "4-(4-alkylidene..." should be --4-(2-alkylidene...--;
In column 5, line 5, that portion of the formula reading "$\begin{array}{c} R^1-C-CO- \\ | \\ CHR^2 \end{array}$"    should read:    $\begin{array}{c} R^1-C-CO- \\ \| \\ CHR^2 \end{array}$ ;

In column 5, line 11, that portion of the formula reading

"$\begin{array}{c} R^1-C-CO- \\ | \\ CHR^2 \end{array}$"    should read:    $\begin{array}{c} R^1-C-CO- \\ \| \\ CHR^2 \end{array}$ ;

In column 5, line 25, that portion of the formula reading

"$\begin{array}{c} R^1-C-CO- \\ | \\ CHR^2 \end{array}$"    should read:    $\begin{array}{c} R^1-C-CO- \\ \| \\ CHR^2 \end{array}$

SIGNED AND
SEALED
SEP 22 1970

(SEAL)
Attest:

Edward M. Fletcher, Jr.
Attesting Officer

WILLIAM E. SCHUYLER, JR.
Commissioner of Patents